(12) United States Patent
Havimäki

(10) Patent No.: US 8,072,617 B2
(45) Date of Patent: Dec. 6, 2011

(54) METHOD AND ARRANGEMENT FOR MEASURING TIMBER PIECE

(75) Inventor: Esko Havimäki, Mieto (FI)

(73) Assignee: Ponsse Oyj, Vierema (FI)

( * ) Notice: Subject to any disclaimer, the term of this patent is extended or adjusted under 35 U.S.C. 154(b) by 321 days.

(21) Appl. No.: 12/439,483

(22) PCT Filed: Aug. 29, 2007

(86) PCT No.: PCT/FI2007/050462
§ 371 (c)(1), (2), (4) Date: May 8, 2009

(87) PCT Pub. No.: WO2008/025881
PCT Pub. Date: Mar. 6, 2008

(65) Prior Publication Data
US 2010/0027034 A1    Feb. 4, 2010

(30) Foreign Application Priority Data

Aug. 31, 2006 (FI) ...................................... 20065540

(51) Int. Cl.
*G01B 11/00* (2006.01)
*A01G 23/08* (2006.01)
(52) U.S. Cl. ........ 356/634; 356/635; 144/335; 144/356; 144/4.1
(58) Field of Classification Search .......... 356/625–636; 144/335, 356, 391, 4.1; 250/223 R, 559.25, 250/561, 226
See application file for complete search history.

(56) References Cited

U.S. PATENT DOCUMENTS

| | | | | | |
|---|---|---|---|---|---|
| 4,294,149 | A | * | 10/1981 | Olsson | 83/435.21 |
| 4,308,461 | A | * | 12/1981 | Tuomaala | 250/559.25 |
| 4,891,530 | A | * | 1/1990 | Hatji | 250/559.4 |
| 4,984,961 | A | * | 1/1991 | Herolf | 414/812 |
| 5,052,452 | A | * | 10/1991 | Goenner | 144/4.9 |
| 5,400,843 | A | * | 3/1995 | Gonner et al. | 144/4.9 |
| 5,564,573 | A | * | 10/1996 | Palm et al. | 209/518 |
| 6,135,175 | A | * | 10/2000 | Gaudreault et al. | 144/4.1 |
| 6,182,725 | B1 | * | 2/2001 | Sorvik | 144/335 |
| 6,817,393 | B2 | * | 11/2004 | Quenneville | 144/357 |
| 7,315,794 | B1 | * | 1/2008 | Willis | 702/159 |
| 7,320,349 | B2 | * | 1/2008 | Gatz | 144/335 |
| 2005/0133115 | A1 | | 6/2005 | Gatz | |

FOREIGN PATENT DOCUMENTS

| | | |
|---|---|---|
| FI | 106092 B | 12/1999 |
| WO | WO-2005/043983 A1 | 5/2005 |
| WO | WO-2006/092469 A1 | 9/2006 |

* cited by examiner

*Primary Examiner* — Sang Nguyen
(74) *Attorney, Agent, or Firm* — Birch, Stewart, Kolasch & Birch, LLP

(57) ABSTRACT

The invention relates to a method and arrangement for measuring a timber piece (4) in a wood handling machine (1). Such a wood handling machine comprises booms (2) arranged in a base machine and a wood handling device (3) operating therein. In such a wood handling machine (1), a wood handling device (3) grips the timber piece (4) to be handled, after which one end of the timber piece is guided into a measuring carriage (5) in the wood handling machine by the wood handling device. The timber piece arranged in the measuring carriage is subjected to one or more observation measures by observation means provided in the measuring carriage.

22 Claims, 2 Drawing Sheets

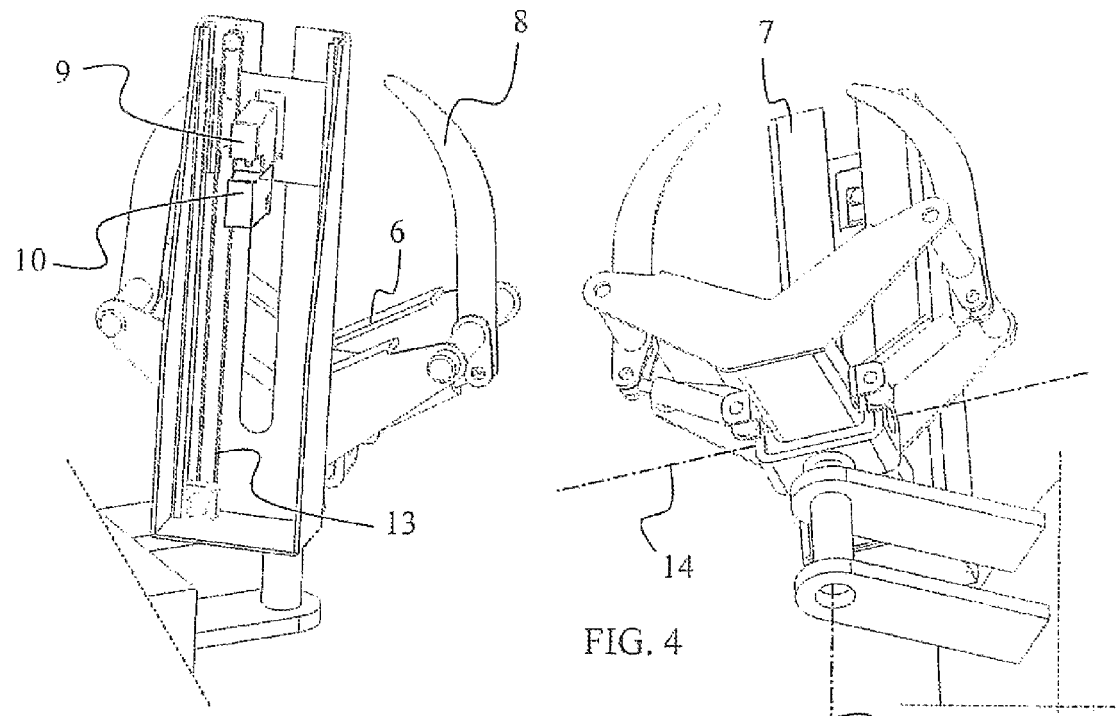
FIG. 3
FIG. 4
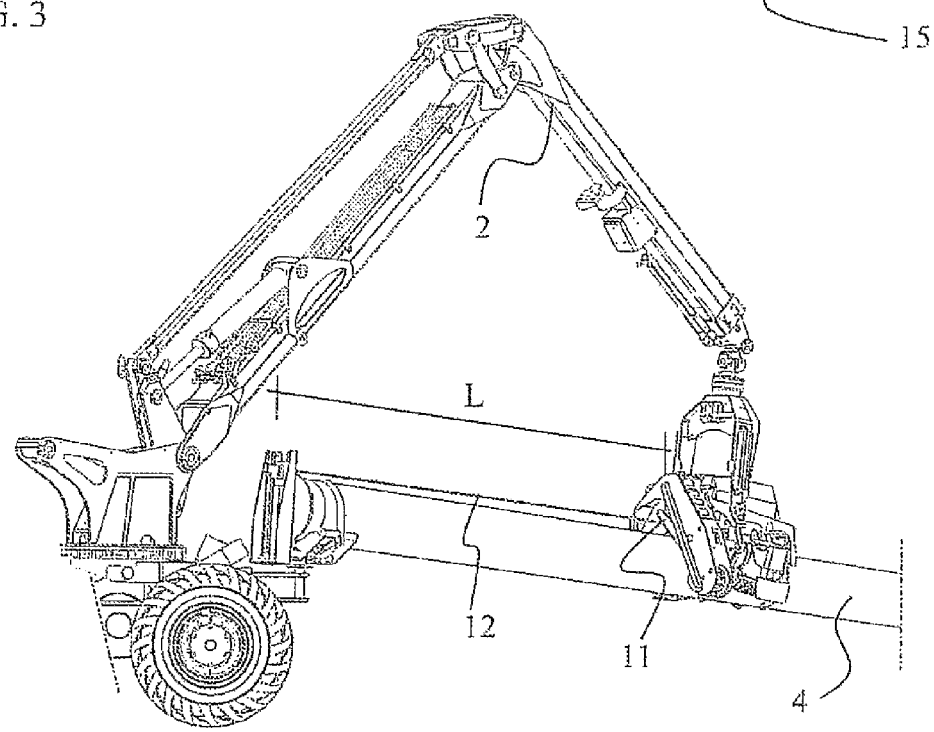
FIG. 5

METHOD AND ARRANGEMENT FOR MEASURING TIMBER PIECE

BACKGROUND OF THE INVENTION

The present invention relates to a method of measuring a timber piece according to the preamble of claim 1.

The invention also relates to an arrangement for measuring a timber piece according to the preamble of claim 13.

In particular, this kind of method and arrangement are applied to adjusting measurement of a timber piece in a wood handling machine and to calibrating wood measuring devices known per se.

In modern mechanical timber harvesting, in particular in timber harvesting according to what is known as "a cut-to-length method", the demands set on the accuracy of the measurement of timber piece dimensions are constantly increasing. One reason for this is that nowadays most of the timber trade is based on measurement data automatically collected by a wood handling machine. In that case, legislation also lays down certain requirements for the measurement accuracy in timber trade. On the other hand, the benefits of accurate measurement become evident in timber harvesting based on the cut-to-length method when a whole tree trunk to be handled has to be evaluated in view of the optimal utilization of raw material after felling.

Usually, at least the diameter and length of a tree trunk or pieces to be cut from it must be measured in mechanical timber harvesting. The measurement is carried out with a certain accuracy and allowed uncertainty of measurement.

During harvesting, the diameter of a timber piece is generally measured by means which are arranged against its surface and follow it, for example by measuring the position of the feeding and/or delimbing means in the wood handling machine with respect to the frame of a harvesting head. In the length measurement, it is common to use a kind of measuring wheel which is pressed against the tree trunk and rolls along it as the tree trunk moves in the wood handling machine. Thus the measuring wheel measures the distance it travels along the outer surface of the tree trunk. The methods described above are based on the assumption and measuring principle that the tree trunk is constantly in contact with the means used in measuring.

On the other hand, measuring methods based on contact free techniques, for example, are also available. Such measuring methods may be, for example, optical or based on the use of microwaves or ultrasound. In addition to the mere outer dimensions of a timber piece, some of the above-mentioned measuring methods may also be able to determine the quality of timber or values of variables describing other properties.

Representatives of the wood processing industry, in particular, have lately expressed wishes that quality properties essential to wood processing be measured immediately in connection with mechanical timber harvesting. It would be interesting, for example, to determine knottiness, solids content, growth rate, age and, in particular, factors that deteriorate timber quality, such as skewness, decay or other faults.

It is, however, common to all measuring methods used that their accuracy needs to be monitored constantly. For example, measuring devices used in measuring the diameter and length have to be calibrated from time to time.

According to the prior art, the measuring device of a wood handling machine is calibrated in a labour-intensive manner using specific calibration scissors and a measuring tape. In practice, calibration of the diameter and/or length comprises at least the following steps:

First, a sufficiently large lot of trees are cut into timber pieces of a desired length by a wood handling machine in each working area. After this, the operator of the wood handling machine stops the machine and goes to measure the timber pieces, being simultaneously aware of their accurate order on the ground. The length and diameter of the timber pieces included in a calibration sample are typically measured at as many points as necessary, the former by a measuring tape, for example, and the latter by a large slide gauge.

Nowadays the diameter is generally measured by electronic calibrating scissors that are specially designed for this purpose and comprise means for storing measurement data and conventionally also a display for immediately showing the diameter data to the person carrying out calibration. According to the prior art, such calibrating scissors comprise a measurement tape known per se for measuring the length and determining the right point for measuring the diameter. Furthermore, such electronic calibrating scissors often inform the person carrying out the calibration of the current length position where the respective diameter is measured.

Any deviation of the cross section of the tree trunk to be measured from the ideal circular shape, in particular, and random errors dependent on the person carrying out measurement cause errors in the diameter measurement of tree trunks. The person carrying out the calibration measurement may also confuse two or more timber pieces to be calibrated with each other. In that case, the calibration result may include considerable errors. Calibration measurements are also prone to errors because they are usually performed in poor weather and lighting conditions. Timber pieces may also roll to a place different from the one where the machine operator placed them.

The result of the diameter measurement is naturally also affected by the fact how strongly the person carrying out the measurement presses the jaws of the measuring scissors against the tree trunk, for instance. The stronger the scissor jaws are pressed, the smaller the diameter result obtained. To take the deviation of the tree trunk cross section from the circular shape into account, two diameters are usually "cross-measured" at each measuring point. In the case of a trunk lying on the ground, cross-measured diameters measured substantially perpendicularly with respect to each other are seldom obtained, although this is usually desirable.

The fact that the diameter is to be determined ocularly in a perpendicular direction with respect to the longitudinal axis of the timber piece may easily also cause errors in the diameter result. The more this direction deviates from the perpendicular direction, the higher the diameter value. It should also be noted that the diameter result is always related to the position of the measuring point in the timber piece's longitudinal direction. In other words, each diameter value of a tree trunk has a respective length value. It should further be noted that the diameter of primary interest is the one measured from under the tree bark. However, the real diameter of a timber piece cannot always be measured from below the bark, at least not in daily work, but the proportion of bark in the diameter is evaluated by specific bark parameters based on research. The accuracy provided by these parameters is naturally limited.

In the length measurement of tree trunks or timber pieces, several other disadvantages also cause measurement errors. In particular, it should be kept in mind that the timber pieces to be measured more or less have the shape of a truncated cone. However, this fact is unfortunately often neglected in the prior art. In other words, when a measuring device is calibrated, the length of the outer surface of a timber piece is often accidentally measured at some point of the timber piece surface. Thus the measuring tape may be arranged in parallel with the surface of the truncated cone-shaped tree trunk, which provides a length value greater than the length of the central axis of the timber piece. The desired length is primarily estimated ocularly and free-hand by simultaneously keeping the measuring tape approximately parallel with the central axis of the timber piece.

The surface of a tree trunk is often also faulty, having for example knot stubs, or the timber piece is skewed, which may also cause errors in the measurement result. It is also possible that the ends of the timber piece have not been sawed perpendicularly with respect to the central axis of the tree trunk. In particular, the cut surface sawed to a butt log in felling may easily deviate from the perpendicular direction with respect to the central axis of the tree.

The result of the length measurement of a timber piece is naturally also affected by how strongly a measuring tape or another measuring means is stretched or pulled at the measuring moment.

According to the prior art, the quality of a timber piece is monitored and measured mainly ocularly, this being one the most important and stressing tasks of the operator of a wood handling machine. A skilled wood handling machine operator is able to measure various factors that affect the timber quality while working efficiently. However, as mechanical timber harvesting is becoming more common and introduced into new geographic locations, there will be problems of finding operators who are sufficiently skilled in quality evaluation and able to make quick decisions. There is thus a clear need for automatic quality determination of timber pieces.

BRIEF DESCRIPTION OF THE INVENTION

The object of the present invention is to eliminate the above-mentioned drawbacks and to provide a simple solution which eliminates random errors caused by the operator of a wood handling machine and makes the calibration of a measuring device easier and more accurate. On the other hand, the solution according to the invention may be used as such for measuring a timber piece more accurately than in the prior art and, more importantly, more reliably with reproducible results.

This object is achieved by the characteristics of the method and arrangement for measuring a timber piece defined in the claims in accordance with the invention.

More precisely, the method according to the invention is characterized by what is disclosed in the characterizing part of claim 1.

The arrangement according to the invention is mainly characterized by what is disclosed in the characterizing part of claim 13.

Preferred embodiments of the invention are disclosed in the dependent claims.

The invention is thus based on the idea that calibration of a measurement device, which earlier required a lot of manual work and interruption of timber harvesting, can now be performed flexibly as part of normal timber harvesting.

The invention provides significant advantages. The calibration of a measuring device of a wood handling machine becomes easier and significantly faster as this may be performed without the operator stopping the wood handling machine and getting out of the cab. The calibration of one timber piece is expedited from several minutes to a few dozens of seconds at best or even more.

On the other hand, in the case of very difficult trees or trees selected on other grounds, the actual measurement may also be carried out by the arrangement according to the invention. This is particularly important in the determination of quality properties of a timber piece, which requires sensors that are difficult to install in wood handling devices at the ends of booms, such as harvester heads. Instead, an apparatus for measuring various quality properties is easier to arrange in a measuring carriage located in connection with a base machine or boom structure of a wood handling machine. On the other hand, the means for measuring dimensions and quality properties of a timber piece may also be integrated mostly in the same structures in the arrangement according to the invention.

For example, a measuring means for measuring the position of a timber piece end or base with respect to the measuring carriage could, in addition to the technique enabling mere distance measurement, be provided with a prior art optical solution for distinguishing annual rings from the cut surface of the timber piece, for example. This information can further be used for determining the density and age of the timber piece.

Calibration measurements and sampling can always be performed in substantially the same manner and most of the human errors involved in calibration measurement will be eliminated. When contact-free measurement, in particular, is used, the accuracy on a highly reflective surface is about 5 mm, i.e. considerably better compared to the measurement by a measuring tape. Furthermore, the measurement directly provides the distance between the ends of a timber piece, which is of primary importance. This differs from the conventional use of a measuring tape, which provides a conical surface measurement involving unevenness.

At the moment, various regulations and recommendations require that the measuring devices of wood handling machines should be calibrated at certain intervals. In practice, the operator of a wood handling machine may select a suitable sample for this purpose. The present method and arrangement improve the representativeness of samples used in calibration by providing a system where the data system of a wood handling machine automatically selects a random sample of tree trunks. The advantages of the method and arrangement of the invention become evident when this system is introduced.

When the system according to the invention is used, inclusion of individual trunks in a measurement sample poses no additional problems. In the case of some timber pieces or tree trunks, only one step is introduced into the conventional process of felling, cutting, feeding and delimbing.

The systematic and random errors that have made calibration unreliable may be totally eliminated or their effect reduced significantly.

The arrangement according to the invention and the related method are simple to learn and may thus be installed both in new and old harvesting machines.

Since the measuring device of a wood handling machine is always calibrated, the use of timber material also becomes more efficient. Thus a tree trunk may be cut already in the forest to the desired length as accurately as possible, which allows avoiding unnecessarily large trimming allowances. It is easy to calculate the savings in timber material, and these can be shown to be considerable. A high accuracy of length and diameter measurements is an essential requirement for fast and successful "value-scaling", which is a conventional way of selecting the cut points in a tree trunk so as to obtain as high a value for the timber material as possible.

The device according to the invention also improves the occupational safety and ergonomics as the need for the operator of a wood handling machine to move between the machine cab and the machine surroundings is reduced considerably. It should be noted that a significant number of occupational accidents in mechanical timber harvesting result from slipping or failing down the stairs of machines or the like or from failing down on the ground surrounding a wood handling machine.

Other advantages provided by the invention are described below in connection with a more detailed description of preferred embodiments of the invention.

BRIEF DESCRIPTION OF FIGURES

In the following, some preferred embodiments of the invention will be described in greater detail with reference to the accompanying drawing, in which FIG. 3 illustrates a rear view of the measuring carriage according to FIG. 2, FIG. 4 illustrates the measuring carriage according to FIG. 2 diagonally from below, and FIG. 5 illustrates the operating principle of the arrangement according to the invention in the length measurement of a timber piece.

DETAILED DESCRIPTION OF PREFERRED EMBODIMENTS

Some preferred embodiments of the method and arrangement for measuring a timber piece are described in the following with reference to the above-mentioned figures. In that case, the method and arrangement comprise the components denoted by reference numbers in the figures that correspond to the reference numbers used in this description.

The figures illustrate a wood handling machine 1 comprising a wood handling device movable by booms 2. In this embodiment, this kind of device consists of a harvesting head 3 for felling and handling a tree so as to provide one or more timber pieces 4. Such a harvesting head comprises conventional measuring means for measuring the diameter and length of a timber piece during handling, which are not described in greater detail here.

Figure 1:
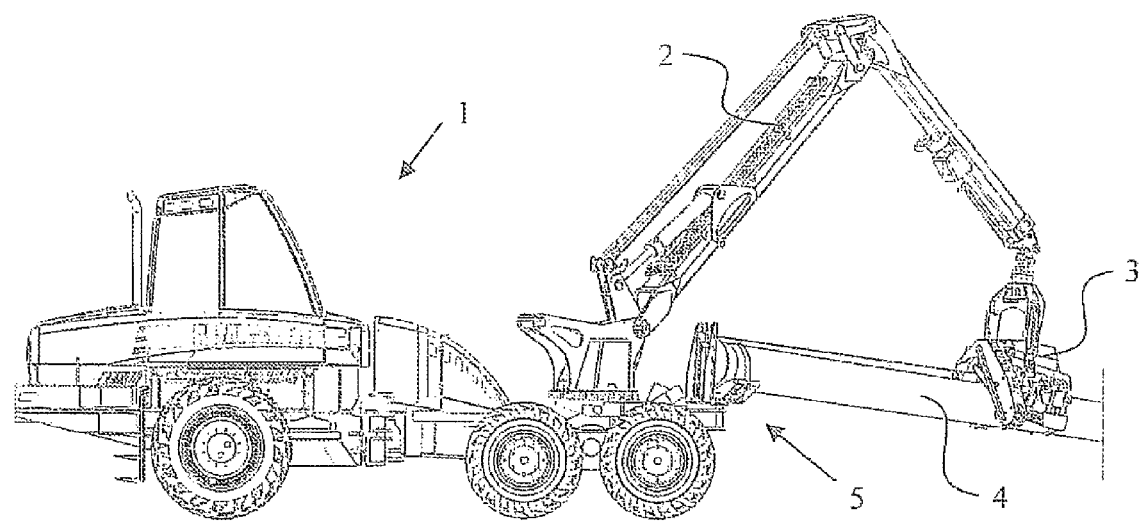
FIG. 1 is a schematic view of an arrangement according to the invention installed in a harvesting machine.
Figure 2:
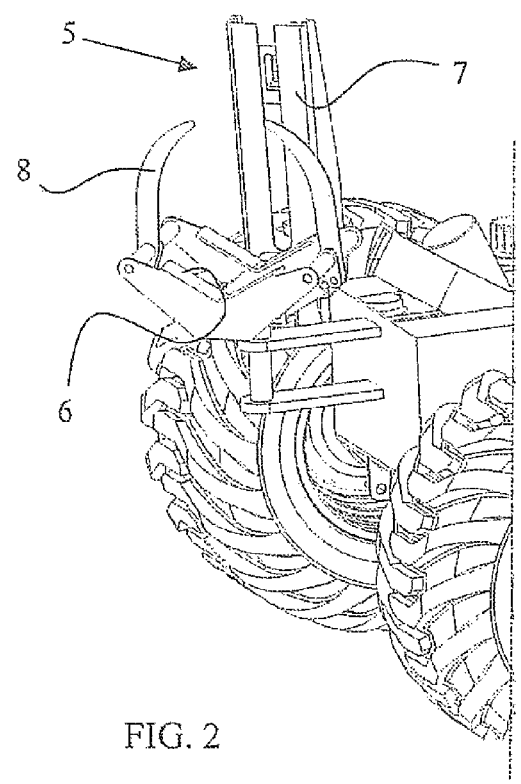
FIG. 2 illustrates a front view of a measuring carriage according to the invention.

In the present arrangement, the wood handling machine 1 is provided with a measuring carriage 5, consisting of a concave planar surface 6, which is illustrated in greater detail in FIG. 2 and which supports the lower surface of one end of a tree handled by the harvesting head 3, i.e. a tree trunk or a timber piece 4 sawn off. The measuring carriage preferably comprises at least one counter surface 7 towards which the tree is guided by the harvesting head. The measuring carriage may also be provided with one or more gripping means 8 for gripping the end of the timber piece guided into the measuring carriage.

The measuring carriage 5 may also be provided with one or more monitoring means 9 and 10 for accurately determining the distance of the timber piece 4 head arranged in the measuring carriage from the counter surface 7. These monitoring means may also be used for determining the cross-sectional shape of the timber piece end or its other physical properties of interest. Preferably this monitoring means may also be the same means as the one used for measuring the timber piece length. When the timber piece end arranged in the measuring carriage is examined, the monitoring means is only transferred to monitor the cut surface at the timber piece end. In that case, the preferably contact-free monitoring means is arranged to be moved substantially in the direction of the radius of the timber piece cross-sectional surface so as to enable measurement of the timber piece length as well as examination of the base cut surface. Such movement of the monitoring means may be implemented by utilizing prior art mechanical, electrical, pneumatic or hydraulic transfer systems.

However, the main component of the measuring carriage 5 consists of measuring means 9 for determining accurately the length of the timber piece 4 arranged in the measuring carriage. In that case, the present arrangement can yield a length measure extending substantially from the counter surface 7 to a reference surface 11 in the wood handling device. Since the distance of the timber piece from the counter surface is known, a very accurate timber piece length measure is obtainable.

The distance L between the counter surface 7 and the reference surface 11 may be determined in various ways, contact-free measurement being the most preferred one. However, there are no obstacles to using a mechanical slide gauge in the measurement.

The above-mentioned contact-free measurement may be performed by a laser-operated or radio wave-operated measuring means 9. In addition, optical methods suitable for measuring are also available, such as various camera-based computer vision applications.

When the timber piece end is supported by the measuring carriage, the diameter of the timber piece may be measured by the monitoring means 10 or gripping means 8 arranged in the measuring carriage.

The placement of the monitoring means 9 and 10 in the measuring carriage as well as their attachment thereto may be modified in various ways. For example, the measuring means 9 may be fixed to the frame of the measuring carriage so that the measuring beam 12 to be transmitted from the measuring means always travels past the measuring carriage frame, hitting some point of the harvesting head frame, for example the plate of a saw cover shaped for this purpose.

The monitoring means 9 and 10 may also be attached rotatably to the measuring carriage 5 by connecting them to a frame in the counter surface, for instance. In that case, the monitoring means rotate substantially in the plane defined by the counter surface 7. The rotation arc may be limited to 90 degrees, for example, but may also be a full circle of 360 degrees. Such a monitoring means that rotates in the plane of the counter surface may be used for observing the timber piece 4 end in the cross direction by rotating the guide track of the gripping means by about 90 degrees between two successive instances of observation.

The measuring means 8 may also be attached to the frame of the measuring carriage 5 so that it may rotate in respect of at least one degree of freedom for directing the measuring beam 12 at a certain part of the harvesting head 3. The directing is either performed by the operator of the harvesting machine or the measuring means may move automatically towards the right spot on the basis of reflection utilizing "laser scanning", for example. If the beam is directed manually, it should be in the area of visible light.

The length measurement of a timber piece, in particular, may preferably also be implemented by first directing the measuring beam 12 automatically and then displaying the measurement result to the operator of the wood-handling machine 1 for approval. Compared to a fully automatic solution, the system's interference resistance may be improved by leaving the final approval of the measurement result and observation of any external interference with the operator.

The reference surface 11 at the harvesting head 3 may be coated with a reflective material or another material for a specific purpose, in which case it is easier to detect whether the measuring beam 12 hits the surface. A laser-operated measuring means 9, for example, may be attached so that it can be moved substantially perpendicularly to the central axis of the timber piece in the measuring carriage. Exactly this kind of embodiment is illustrated in the attached figure. In this embodiment, the measuring means and any monitoring means 10 arranged in connection with it move up and down a distance corresponding to the timber piece diameter substantially in the direction of the timber piece radius and are driven by a cogged belt 13, which is driven by an electric motor. This structure can best be seen in FIG. 3. In that case, it is easier to make the measuring beam 12 always hit the same point of the harvesting head 3, e.g. the reference surface 11 provided in a saw flange, as illustrated in FIG. 5.

A saw flange is particularly suitable for use as a reference surface because it is in the right position of the tree trunk during the measurement, i.e. at the point where the trunk is to be cut. Thus the use of a saw flange as the reference surface requires no correction of measurement data, but the data may be utilized immediately. On the other hand, the use of a saw flange also keeps the surface clean as the flange surface wipes the tree surface in connection with each saw cut. Thus the reflective properties of a reference surface formed in the saw flange remain constantly good without any separate cleaning measures.

The position of the measuring means 9 with respect to the timber piece 4 diameter may be determined electrically or mechanically on the basis of diameter data provided by the gripping means 8, for example. The perpendicular movement of the measuring means may also otherwise improve the measuring accuracy.

The measuring range of laser-operated measuring means 9 suitable for the solution is typically approximately 0.1 to 8 m. When the measuring means is positioned approximately 10 cm away from the counter surface 7, it can also measure the distance of the timber piece 4 end from the counter surface. In that case, accurate arrangement of the timber piece against the surface is not necessary but the length measure may be corrected by the distance value obtained, which makes the measurement more reliable and faster. At the same time, the shape of the sawing surface at the timber piece end may be measured, i.e. in this case its straightness if this is needed to correct the measurement results.

By detecting the movement of the measuring means 9 with respect to the central axis of the timber piece 4 with a sufficient accuracy, the data obtained may be used in determining the diameter of the sawing surface at the timber piece end. By also allowing the measuring means to transmit the measuring beam 12 as it moves with respect to the central axis of the timber piece from up to down, the shape of the end surface of the timber piece may also be determined. At the same time, the measuring program of the measuring means recognizes the end of the timber piece, calculates the diameter and stops the measuring means at the correct height for length measurement.

The present arrangement for measuring the length of a timber piece functions as follows. The arrangement comprises a measuring carriage 5 which supports the lower surface of one end of the timber piece 4. Gripping means 8 press the timber piece end tightly against a concave planar surface 6 arranged in the measuring carriage, for instance. The gripping means are moved in the device by hydraulic actuators or by another pneumatic or electric actuator.

When the timber piece 4 is being introduced into the measuring carriage 5, the timber piece is brought close or nearly close to the counter surface 7 in the measuring carriage. A laser-operated distance sensor functioning as a measuring means 9 is preferably connected to this counter surface. The measuring means, as well as any other monitoring means 10, may be moved along the trunk of the counter surface with respect to the end surface of the timber piece. When the measuring means is outside the end surface defined by the timber piece surface, it transmits a measuring beam 12 in the form of a laser beam past the timber piece. The laser beam always hits a predetermined part of the harvesting head 3, such as the saw flange, as illustrated in FIG. 4. Preferably, this reference surface 11 has been selected so that it is as close to the cut point of the tree trunk as possible.

The measuring means 9 is preferably attached to the wood handling machine 1 through the counter surface in the measuring carriage 5 so that it at least partly rotates about the vertical axis 14 and swings in the horizontal plane by means of a joint 15, as is illustrated in FIG. 4. Thus the measuring means always rotates to the correct position with respect to the timber piece 4 end arranged in the measuring carriage. Consequently, the distance L between the counter surface of the measuring carriage and the reference surface 11 may be determined from the reflection and thus the timber piece length calculated.

The gripping means 8 may be provided with angle sensors, for example, in which case they may be used for measuring the diameter of the timber piece 4 end at a predetermined distance from the timber piece end. After the timber piece has been measured, the gripping means open and the operator lifts the timber piece from the measuring carriage 5 for sawing. After sawing, the next timber piece of the tree trunk is fed and the timber piece end is introduced into the measuring carriage. This is repeated until the whole tree trunk has been measured and sawed. After the tree trunk has been measured, the arrangement suggests, if necessary, further measurements, changing the calibration of the measuring devices in the harvesting head 3 or other measures. The operator does not need to interrupt his work but everything may occur automatically during felling and cutting.

The arrangement according to the invention may also be provided with a solution enabling measurement of the timber piece 4 diameter at a point other than the end of the timber piece or at the gripping means 8 arranged to hold the tree. Preferably, the diameter of a timber piece supported against the measuring carriage 5 may be measured at a distance from the measuring carriage and against its counter surface 7 by, for example, providing the arrangement with measuring scissors or other gripping means suitable for measurement whose distance from the counter surface of the measuring carriage may be adjusted by hydraulic actuators and a conductor enabling parallel movement with the longitudinal axis of the timber piece, for instance.

It will be obvious to a person skilled in the art that as technology advances, the inventive concept of the method and the arrangement implementing it may be implemented in various ways. The solution described and its embodiments are thus not restricted to the examples described above but may vary within the claims.

The invention claimed is:

1. A method of measuring a timber piece in a wood handling machine, which comprises booms and a wood handling device arranged in a base machine, the method comprising:
   gripping, by the wood handling device, the timber piece to be handled by the wood handling machine;
   after the step of gripping the timber piece, guiding, by the wood handling device, one end of the timber piece with a cut surface into a measuring carriage, wherein the cut surface at the one end of the timber piece is guided to face a counter surface of the measuring carriage, whereby
   the timber piece arranged in the measuring carriage is subject to one or more observation measures related to physical timber properties.

2. The method according to claim 1, further comprising determining at least one property describing an outer dimension of the timber piece by at least one observation means arranged in the measuring carriage.

3. The method according to claim 2,
further comprising moving the observation means along the cut surface at the one end of the timber piece substantially in a direction of a radius of a cross-sectional surface of the timber piece, and simultaneously observing the properties of the cut surface by the observation means.

4. The method according to claim 1,
further comprising determining the diameter of the timber piece when the one end of the timber piece is gripped in the measuring carriage.

5. The method according to claim 4,
further comprising applying the obtained diameter value of the timber piece in calibrating the actual diameter measuring device in the wood handling device of the wood handling machine.

6. A method of measuring a timber piece in a wood handling machine, which comprises booms and a wood handling device arranged in a base machine, wherein
the wood handling device grips the timber piece to be handled by the wood handling machine, after which
one end of the timber piece is guided into a measuring carriage in the wood handling machine by the wood handling device, whereby
the timber piece arranged in the measuring carriage is subjected to one or more observation measures related to physical timber properties,
wherein at least one observation means arranged in the measuring carriage is used for determining at least one property describing an outer dimension of the timber piece, and wherein
measuring means formed by the observation means is used to determine the length measurement of the timber piece in such a manner that the measuring means is arranged in the measuring carriage in a position where
a measuring beam transmitted by the measuring means travels past the timber piece arranged in the measuring carriage, whereby
the measuring beam hits a reference surface in the wood handling device as close to a cut point of the tree trunk as possible and is reflected back to the measuring means, after which
a distance (L) between the measuring means and the reference surface is calculated from the reflection of the measuring beam reflected from the reference surface, which allows determining the length of the timber piece.

7. The method according to claim 6, wherein
the measuring means is moved with respect to the frame of the measuring carriage and outside the cut surface formed by the timber piece arranged in the measuring carriage.

8. The method according to claim 6 or 7, wherein
the wood handling device arranged in the wood handling machine grips the tree trunk and
the tree trunk is guided into the measuring carriage after its delimbing has been finished, whereby
the wood handling device that has stopped at the cut point of the tree trunk forms a reference surface for length measurement.

9. The method according to claim 6, wherein
a counter surface is formed in the measuring carriage for receiving the timber piece to be guided into the measuring carriage, whereby
the observation means determines the distance of the one end of the timber piece arranged in the measuring carriage from the counter surface and surface shape of the one end with respect to the central axis of the timber piece, and
the observation means determines the surface shape of the one end of the timber piece arranged in the measuring carriage with respect to the central axis of the timber piece, after which
the need to correct the timber piece measurement data due to the determined shape and the measure value between the one end of the timber piece and the counter surface is estimated.

10. The method according to claim 6, wherein
the length of the timber piece between the counter surface and the reference surface in the wood handling device is determined by contact-free measurement.

11. The method according to claim 6, wherein
the length of the timber piece between the counter surface and the reference surface in the wood handling device is determined by mechanical measurement.

12. The method according to claim 6, wherein
the obtained length value of the timber piece is applied in calibrating the actual length measuring device in the wood handling device of the wood handling machine.

13. An arrangement for measuring a timber piece in a wood handling machine, comprising
a wood handling device for felling and handling timber movable by booms,
measuring means in the wood handling device for measuring the diameter and length of the timber piece during handling,
a measuring carriage for receiving a timber piece guided by the wood handling device, wherein the measuring carriage comprising gripping means and a counter surface for receiving one end of the timber piece with a cut surface, wherein the counter surface is configured to face the cut surface at the one end of the timber piece; and
monitoring means for determining physical properties of the timber piece.

14. The arrangement according to claim 13, wherein
the monitoring means comprises measuring means for determining the length of the timber piece.

15. The arrangement according to claim 14, wherein
the length of the timber piece is arranged to be determined by a contact-free measuring means.

16. The arrangement according to claim 15, wherein
the measuring means comprises a laser meter.

17. The arrangement according to claim 15, wherein
the measuring means comprises a radio wave meter.

18. The arrangement according to claim 14, wherein
the measuring means comprises a mechanical slide gauge.

19. The arrangement according to claim 13 or 14, wherein
the monitoring means comprises means for determining the distance of the one end of the timber piece from the counter surface.

20. The arrangement according to claim 13, wherein
the monitoring means comprises means for determining the shape of the cut surface at the one end of the timber piece with respect to the central axis of the timber piece.

21. The arrangement according to claim 13, wherein
the monitoring means comprises means for measuring the diameter of the one end of the timber piece arranged in the measuring carriage.

22. The arrangement according to claim 13, wherein
the wood handling device comprises a harvesting head.

* * * * *